(12) United States Patent
Togashi et al.

(10) Patent No.: US 7,006,409 B2
(45) Date of Patent: Feb. 28, 2006

(54) DISC CHANGER

(75) Inventors: Jun Togashi, Saitama-ken (JP); Hideki Kinoshita, Saitama-ken (JP); Satoru Anada, Saitama-ken (JP); Takashi Ota, Saitama-ken (JP); Kiyoshi Morikawa, Saitama-ken (JP); Toshiyuki Sakai, Saitama-ken (JP); Shoichi Naruse, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 355 days.

(21) Appl. No.: 10/634,754

(22) Filed: Aug. 6, 2003

(65) Prior Publication Data

US 2004/0027934 A1 Feb. 12, 2004

Related U.S. Application Data

(62) Division of application No. 09/518,729, filed on Mar. 3, 2000, now abandoned.

(30) Foreign Application Priority Data

Apr. 3, 1999 (JP) .................................. 11-56969

(51) Int. Cl.
*G11B 7/085* (2006.01)

(52) U.S. Cl. ................................................. 369/30.38

(58) Field of Classification Search ...................... None
See application file for complete search history.

(56) References Cited

U.S. PATENT DOCUMENTS

| 5,481,514 A | | 1/1996 | Yamasaki et al. ............. 369/36 |
| 5,903,538 A | | 5/1999 | Fujita et al. ................. 369/178 |
| 5,930,223 A | | 7/1999 | Toyama et al. ............. 369/178 |
| 5,933,404 A | * | 8/1999 | Kage et al. .................. 720/604 |
| 5,959,949 A | | 9/1999 | Yamashita et al. ............. 369/36 |
| 5,970,044 A | * | 10/1999 | Kambayashi et al. ........ 720/713 |
| 6,229,770 B1 | | 5/2001 | Yoshimura ................... 369/36 |

FOREIGN PATENT DOCUMENTS

DE     197 37 496 A1     3/1998

* cited by examiner

*Primary Examiner*—Angel Castro
(74) *Attorney, Agent, or Firm*—Arent Fox PLLC

(57) ABSTRACT

It is an object of the present invention to provide an improved disc changer adapted to exactly detect whether a magazine storing a plurality of discs has been attached in the disc changer. When a magazine storing a plurality of discs is inserted into the disc changer, a detection arm and a lock arm both serving as moving members are moved by such an insertion. The lock arm, by virtue of the movement of itself, engages into an insertion groove provided on the backside of the inserted magazine and locks the magazine on the disc changer. The detection arm, by virtue of the movement of itself, actuates a lock detection switch. Here, since the detection arm and the lock arm are both urged by an urging spring, it becomes possible to exactly detect the attachment of the magazine by allowing the moving members locking the magazine on the disc changer to actuate the lock detection switch.

2 Claims, 11 Drawing Sheets

DISC CHANGER

This is a Division of application Ser. No. 09/518,729 filed Mar. 3, 2000 now abandoned. The disclosure of the prior application is hereby incorporated by reference herein in its entirety.

BACKGROUND OF THE INVENTION

The present invention relates to a disc changer capable of mounting a magazine for storing a plurality of discs such as CD (Compact Disc), drawing a selected disc from the magazine and reproducing the same.

There has been known a conventional disc changer for use in a disc player for reproducing an information recording medium such as CD, which disc changer has been disclosed by the applicant in its earlier Japanese Patent Application Laid-open No. 10-74353. The disclosed disc changer is so fabricated that a user is allowed to insert a detachable magazine (accommodating a plurality of discs) into a disc player, such that one disc may be selected from the magazine so as to be moved to a reproducing position within the disc player.

However, with the above-mentioned conventional disc changer, it is absolutely necessary to detect whether or not the magazine has been attached into the disc changer. For example, if an actual state that the magazine has been attached in the disc changer is not detected, it is impossible to decide a timing for drawing a disc from the magazine to the reproducing section. Accordingly, with a disc changer having a magazine, it is extremely important to detect the attachment of the magazine. In practice, the attachment of the magazine is detected by causing the magazine itself inserted in the disc changer to push a detection switch provided within the disc changer. However, with regard to a disc changer mounted within a vehicle, an undesired influence such as an external vibration can make it impossible to actuate the detection switch even if the magazine has been attached in the disc changer. Moreover, there is also a possibility that an actuated state of the detection switch may be accidentally released.

SUMMARY OF THE INVENTION

It is an object of the present invention to provide an improved disc changer capable of exactly detecting whether or not the magazine has been attached, thereby solving the above-mentioned problems peculiar to the above-discussed prior art.

According to the present invention, there is provided a disc changer comprising: a magazine for storing a plurality of arranged discs; a disc carrier for carrying a selected disc from the magazine to a reproducing position; a transporter for transporting the disc carrier in the disc arranging direction; a disc playing section for playing the selected disc carried from the magazine; a moving section which moves when the magazine is inserted into the disc changer; an urging member for urging the moving section; and a lock detector operable by the movement of the moving section. When the magazine is inserted into the disc changer the moving section engages into an insertion groove provided on the magazine to lock the magazine on the disc changer, and actuates the lock detector.

The above objects and features of the present invention will become better understood from the following description with reference to the accompanying drawings.

DETAILED DESCRIPTION OF THE PREFERRED EMBODIMENTS

Figure 1:
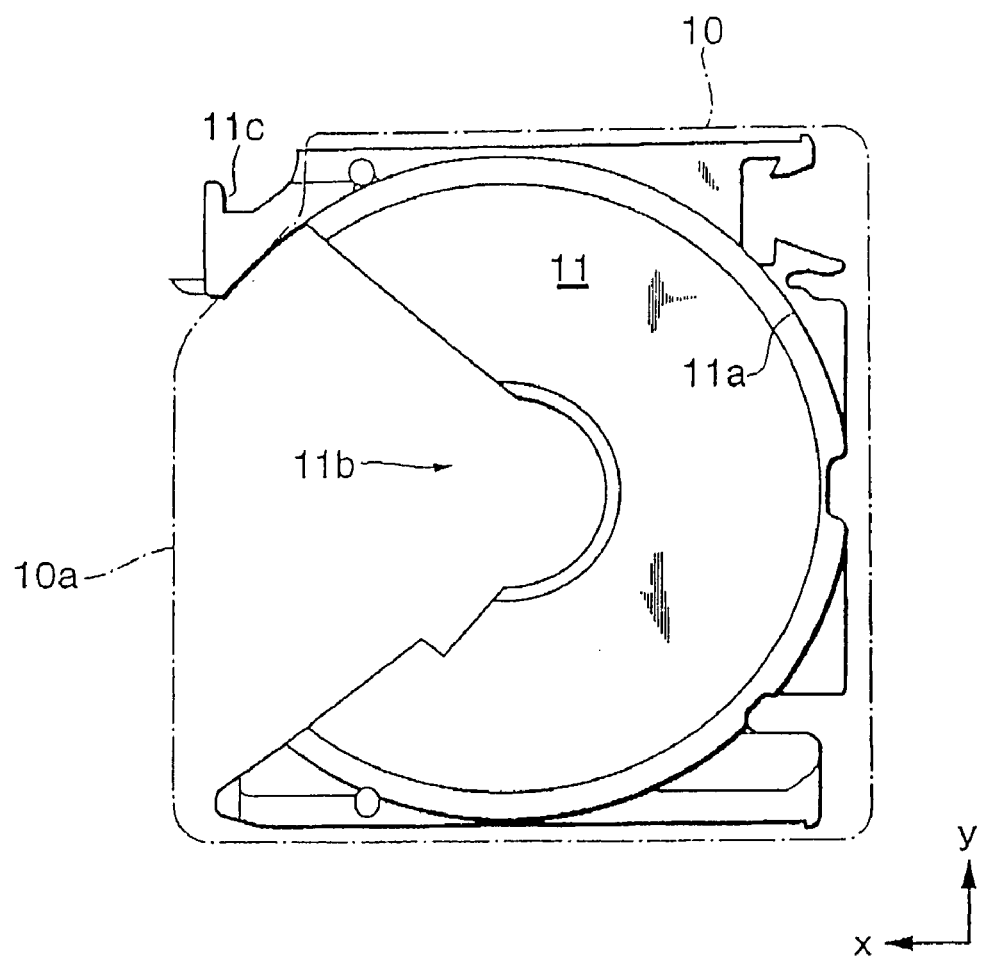
FIG. 1A is a plane view indicating a magazine for use in a disc changer made according to the present invention.
FIG. 1B is a side view of the magazine shown in FIG. 1.
Figure 1:
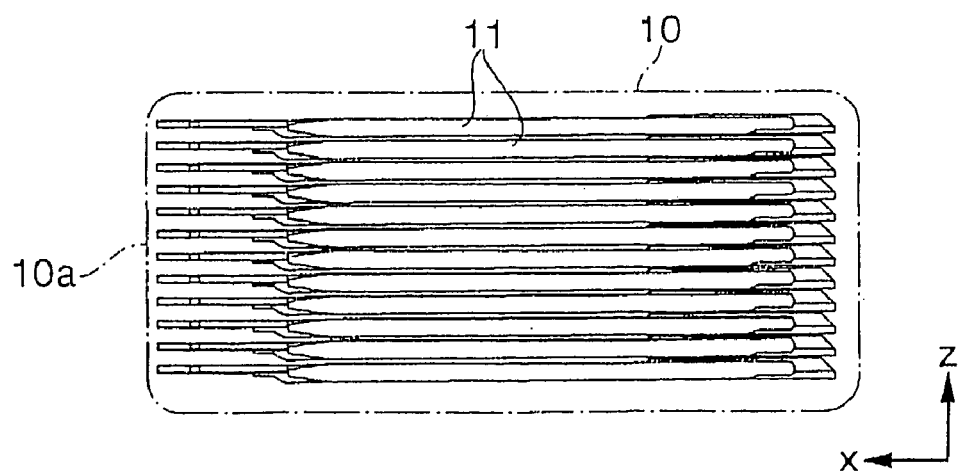

One embodiment of the disc changer made according to the present invention will be described in detail below with reference to FIGS. 1–11 in which, an arrow x is used to represent a direction for a tray 11 to move into or out of a magazine 10, an arrow y is used to represent a direction in which the magazine 10 is allowed to move into or from a disc player, an arrow z is used to represent a direction along which a plurality of trays 11 are arranged in the magazine 10.

FIG. 1A is a plane view indicating an internal structure of the magazine 10, FIG. 1B is a front view of the magazine 10. In both FIG. 1A and FIG. 1B, reference numeral 10a is used to represent an opening formed on one side of the magazine 10. The internal side walls of the magazine 10 are formed with a plurality of horizontal grooves (not shown) each for holding a tray with a disc mounted thereon. Each of the trays 11 has a circular recess portion 11a which presents generally the same shape as a disc and has a notch 11b formed on one side thereof. Further, each tray 11 has an engaging member 11c for use when the tray 11 is drawn out of the magazine 10.

Figure 2A:
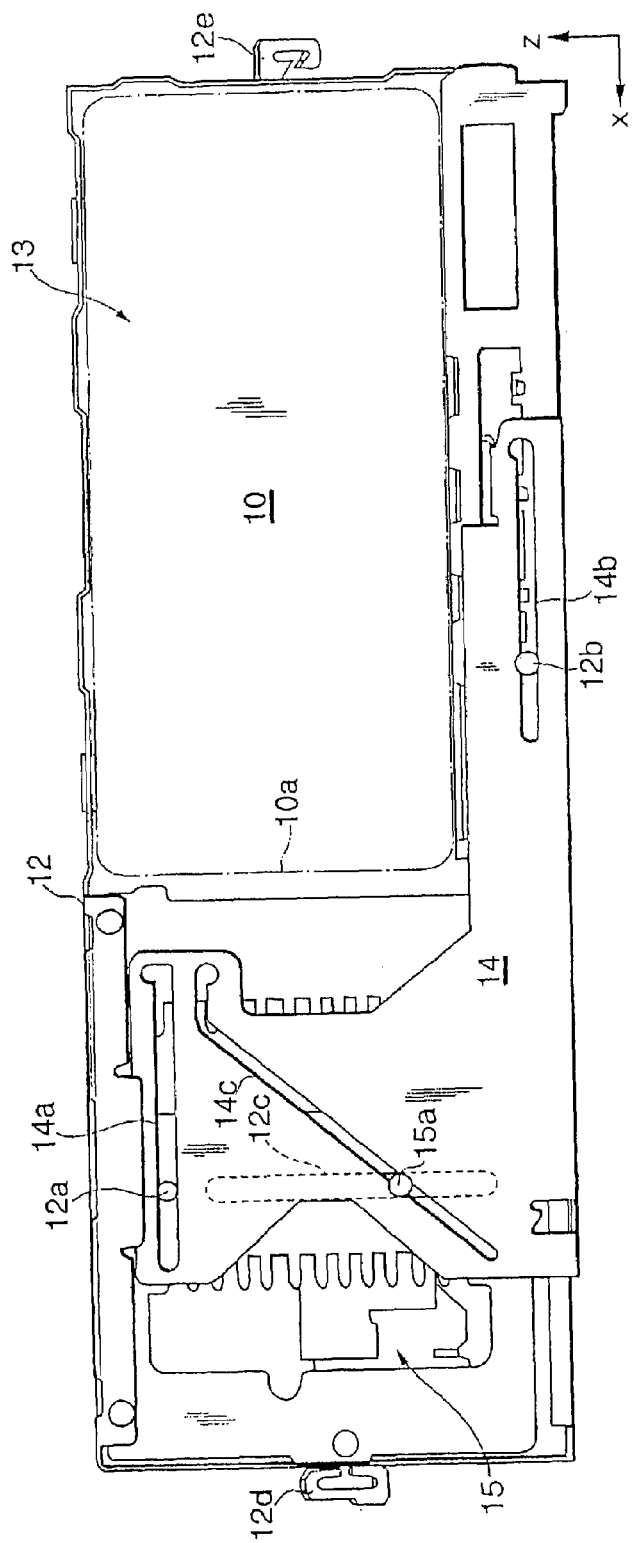
FIG. 2A is a front view indicating the disc changer of the present invention.
Figure 2B:
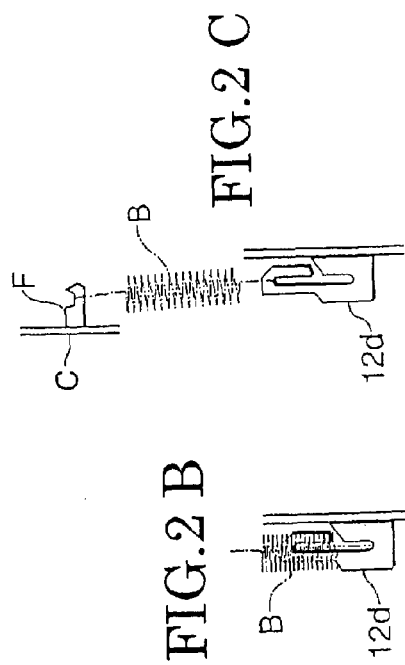
FIGS. 2B and 2C are explanatory views indicating hook members used in the disc changer of the present invention.
Figure 2C:
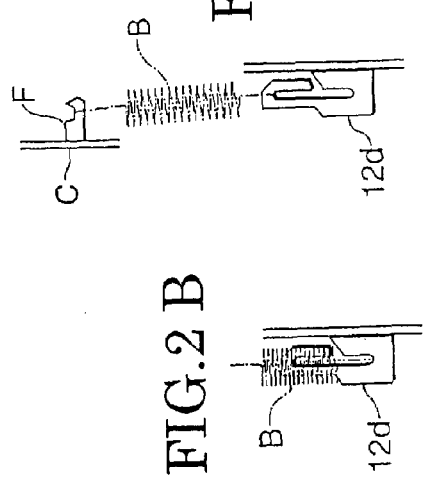

FIG. 2 is a front view of a disc changer made according to the present invention. As shown in FIG. 2, the disc changer employs a generally case-like chassis structure 12 formed with a magazine insertion opening 13, so that the magazine 10 can be inserted into or moved from the disc player.

Further, on the front of the chassis structure 12 there is provided a generally L-shaped cam plate 14 movable reciprocatingly in the direction x. The cam plate 14 has elongated holes 14a and 14b formed in the direction x, and also has an inclined elongated hole 14c. The elongated hole 14a is slidably engaged by an engaging pin 12a of the chassis structure 12. Similarly, the elongated hole 14b is slidably engaged by an engaging pin 12b of the chassis structure 12. Further, the inclined hole 14c is engaged by an engaging pin 15a formed on one side of a reproducing section 15. The engaging pin 15a is also engaged in an elongated hole 12c (extending in the direction Z) formed on one side of the case-like chassis structure 12.

The reproducing section 15 is provided within the chassis structure 12 in a manner such that it can move in the vertical direction by virtue of a lift mechanism which will be discussed later in the specification. The reproducing section 15 is so formed that it can at first draw a selected disc from the magazine 10 and then clamp the disc on a turntable so as to reproduce the information recorded on the disc.

On two mutually opposite side faces of the chassis structure 12, there are integrally formed two hook members 12d and 12e, in order that the chassis structure 12 may be floatingly supported by virtue of a pair of springs B.

The operation for attaching the springs B on to the two hook members 12d, 12e of the chassis structure 12 may be described as follow. Namely, at first, a spring B is attached on to the hook member 12d (having a generally C-shaped configuration). Then, the other end of the same spring B is pulled so as to be connected to a hook F formed on a chassis member C (not included in the chassis structure 12 ). Subsequently, the hook member 12e is connected on to another hook of the chassis member C through another spring B in the same manner, thereby completing the operation for attaching the two springs B. In this way, the operation for attaching the two springs B may be made easy without the necessity of providing a temporary spring hook which is otherwise needed in a prior art.

Figure 3:
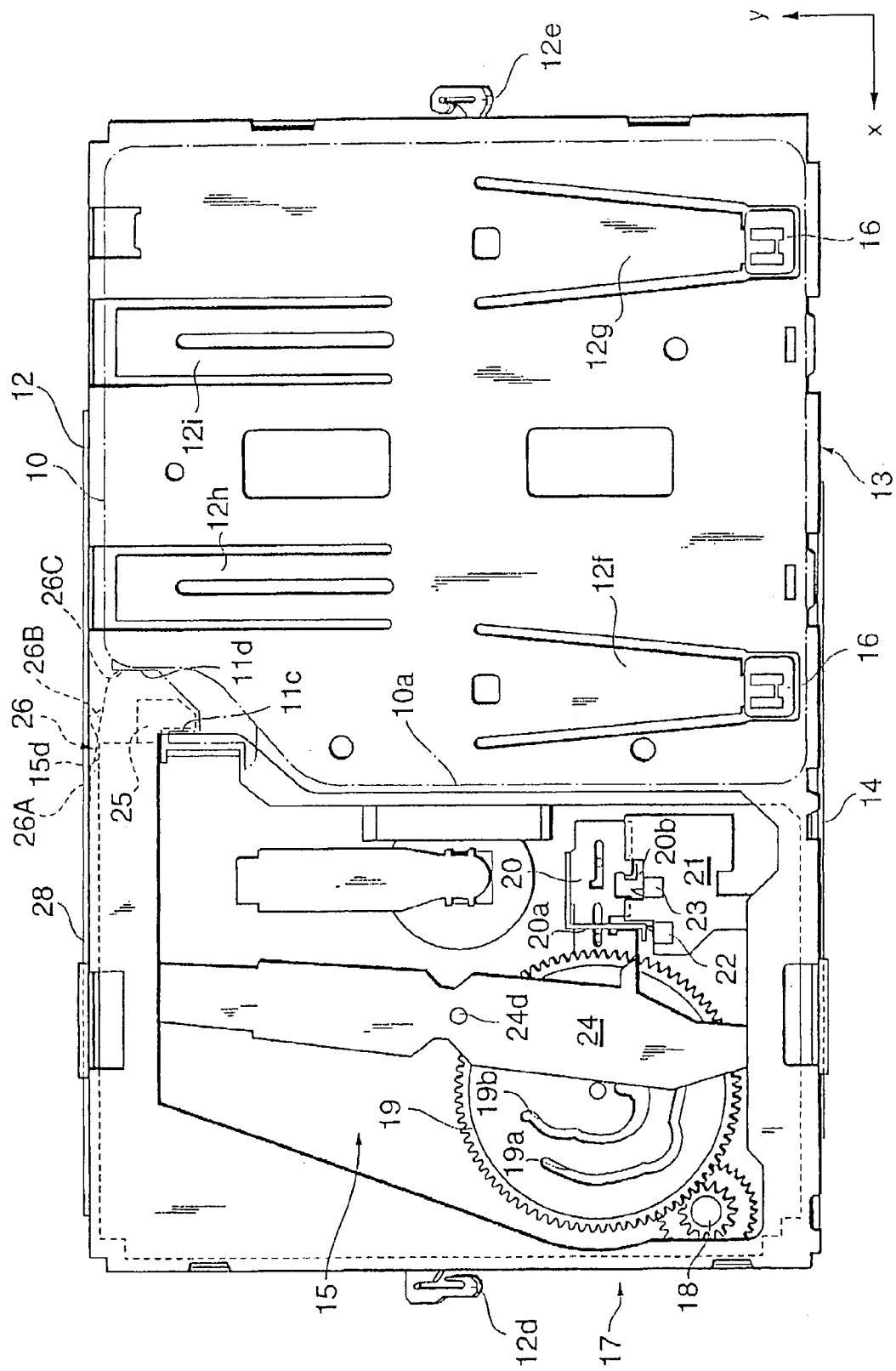
FIG. 3 is a plane view indicating the disc changer of the present invention.

FIG. 3 is a plane view indicating the disc changer of the present invention. As shown in FIG. 3, a plurality of pressing elements 12f–12i (for downwardly pressing the magazine 10 inserted in the disc player) are integrally formed on the surface of the chassis structure 12. In particular, the pressing elements 12f and 12g adjacent to the magazine insertion opening 13 are so formed that each of them is narrower in its front portion than in its rear portion. In this way, when the magazine 10 is inserted into or drawn from the disc player, an undesired stress will not be collected on these rear portions. Moreover, the front portion of each of the pressing elements 12f and 12g has a slip-contact member 16 made of a synthetic resin, thereby ensuring a smooth movement of the magazine 10 when it is inserted into or drawn from the disc player.

On the other hand, the pressing elements 12h and 12i remote from the magazine opening 13 are so formed that each of them has an identical width both in its front portion and in its rear portion. In fact, a bulging treatment has been performed on each of the pressing elements 12h and 12i from its front portion to its rear portion, making its front portion bent slightly downward so as to properly press the magazine 10 inserted in the disc player.

The reproducing section 15 is provided in the vicinity of a position into which the magazine 10 is to be inserted, and has a clamping mechanism 17 for clamping a disc.

The clamping mechanism 17 includes a two-stage gear 18 for transmitting a driving force from a motor (not shown), and a driving gear 19 engaged with the gear 18. The driving gear 19 is formed with two cam grooves 19a and 19b. A switching plate 20 having a pin (not shown) engaged in and movable along the cam groove 19a is allowed to move reciprocatingly in the direction x. By virtue of the specifically formed shape of the cam groove 19a, when the driving gear 19 is rotated, an arm member 20a of the switch plate 20 can make On/Off of a limit switch 22 provided on a base plate 21 of the switching plate 20, while an arm member 20b can make On/off of a limit switch 23 provided on the same base plate, thereby properly controlling the reproduction of a disc. In this way, it is possible to operate two switches with the use of only one operating member (switching plate 20), thereby simplifying the switch mechanism of the disc changer while at the same time improving the precision of the timing of the above On/Off operations.

On the other hand, a pivoting plate 24 has a pin engaged in and movable along the cam groove 19b of the driving gear 19. By virtue of a specific shape of the cam groove 19b, a pivoting plate 24 is caused to pivot about a pivotal shaft 24d so as to complete a semi-circular arc movement. In this way, a selected disc may be clamped in a predetermined position or un-clamped therefrom.

The reproducing section 15 has a tray drawing element 25 which can reciprocatingly move in the direction x and can catch the engaging member 11c of a tray 11 so as to move the tray (with a selected disc mounted thereon) on to a reproducing position. The tray drawing element 25 is shaped and located in a manner such that it will not bump against the trays 11 when the magazine 10 is inserted into or taken from the disc player through a relative movement with respect to the chassis structure 12.

Further, on the inner surface of the chassis structure 12 there are provided a plurality of stopper elements 26 (FIGS. 3 and 4) for preventing the trays 11 from accidentally jumping out of the magazine 10. On the other hand, the reproducing section 15 has a protruding portion 15d (FIGS. 3 and 7) for pressing the stopper elements 26 against the inner surface of the chassis structure 12.

Figures 4A, 4B:
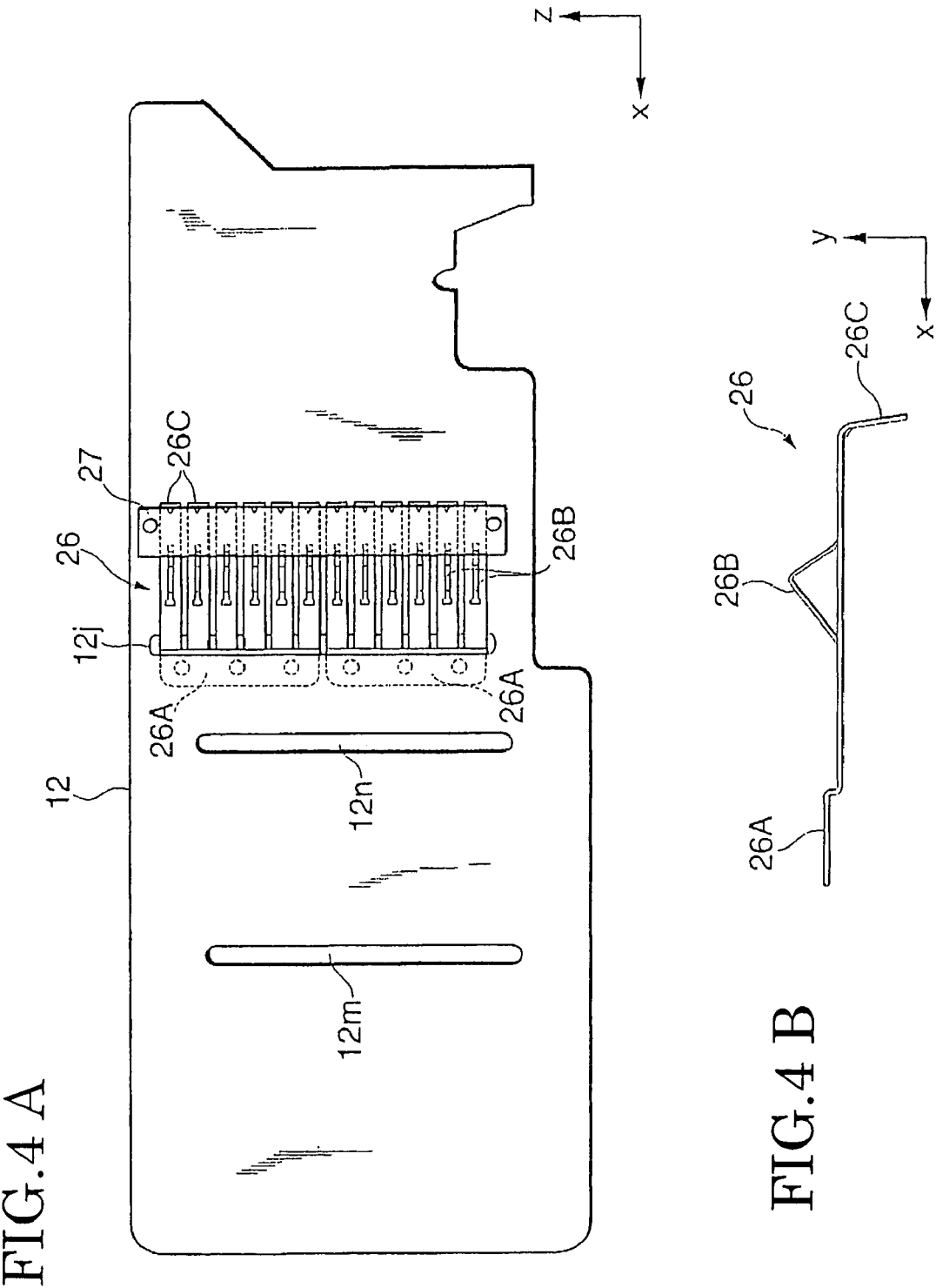
FIG. 4A is a front view indicating part of a chassis structure of the disc changer of the present invention.
FIG. 4B is an explanatory view indicating a stopper element for use in the disc changer of the present invention.

FIG. 4A is a view indicating an internal surface of the chassis structure 12, FIG. 4B is a side view indicating one of the stopper elements 26. As shown in FIGS. 4A and 4B, each stopper element 26 has a rear portion 26A which is inserted through an elongate hole 12j formed in the direction z on the chassis structure 12, and has a protrudingly bent portion 26B protruding in the direction y. In detail, each protrudingly bent portion 26B is caused to protrude through an elongate hole 12k vertically formed in the direction z on the chassis structure 12. Further, each stopper element 26 has a stopper portion 26C bent in the direction y. By virtue of an engagement between a stopper portion 26C and an end portion 11d of a tray 11 (FIG. 7), it is sure to limit the movement of a tray 11 in the direction x. Moreover, a limiting member 27 is attached on the chassis structure 12 for limiting an undesired pivoting movement of the stopper portion 26C.

In the present embodiment, the stopper elements 26 are divided into two groups, with each group including six such elements and with each stopper element for use with one tray 11. In this way, each group of stopper elements 26 is also allowed to be used in a disc changer having a magazine storing only 6 discs.

Further, on the chassis structure 12 there are formed two elongate guide holes 12m and 12n all extending in the direction z. Two pins 15b and 15c formed on the reproducing section 15 are slidably engaged in the guide holes 12m and 12n (FIG. 5).

Figure 5:
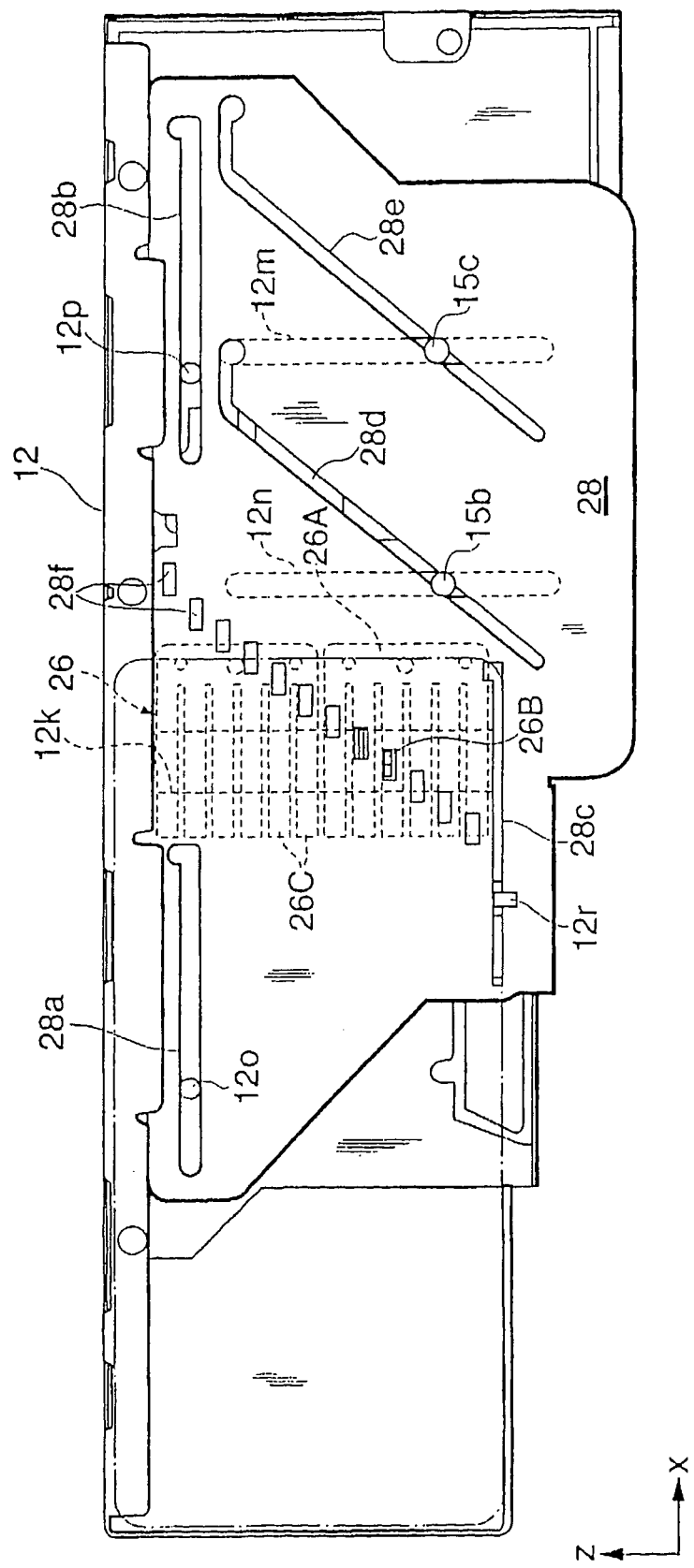
FIG. 5 is a rear view (indicating a surface opposite to a surface shown in FIG. 2A) of the disc changer of the present invention.

FIG. 5 is a view indicating an outer surface of the chassis structure 12. As shown in FIG. 5, a cam plate 28 is attached on said out surface in a manner such that it is reciprocatingly movable in the direction x. In detail, the cam plate 28 has three elongated guide holes 28a, 28b and 28c extending in the direction x, and two inclined holes 28d and 28e.

The guide hole 28a is engaged by an engaging pin 12o formed on the chassis structure 12, while the guide hole 28b is engaged by an engaging pin 12p and the guide hole 28c is engaged by an engaging hook 12r all formed on the chassis structure 12. Further, the inclined guide hole 28d is engaged by an engaging pin 15b, and the inclined guide hole 28e is engaged by an engaging pin 15c, all formed on the reproducing section 15.

Further, as shown in FIG. 5, a plurality of window holes 28f are formed in an inclined formation on the cam plate 28. When the cam plate 28 is moved in the direction x, the protrudingly bent portions 26B of the stopper elements 26 are allowed to protrude still further one by one through the window holes 28f (also one by one). In this way, when the cam plate 28 has caused the reproducing section 15 to arrive at a selected disc tray 11, the height of a window hole 28f of the cam plate 28 will become coincident with a stopper portion 26C of a stopper element 26 (which has become in contact with the selected tray 11).

Figure 6:
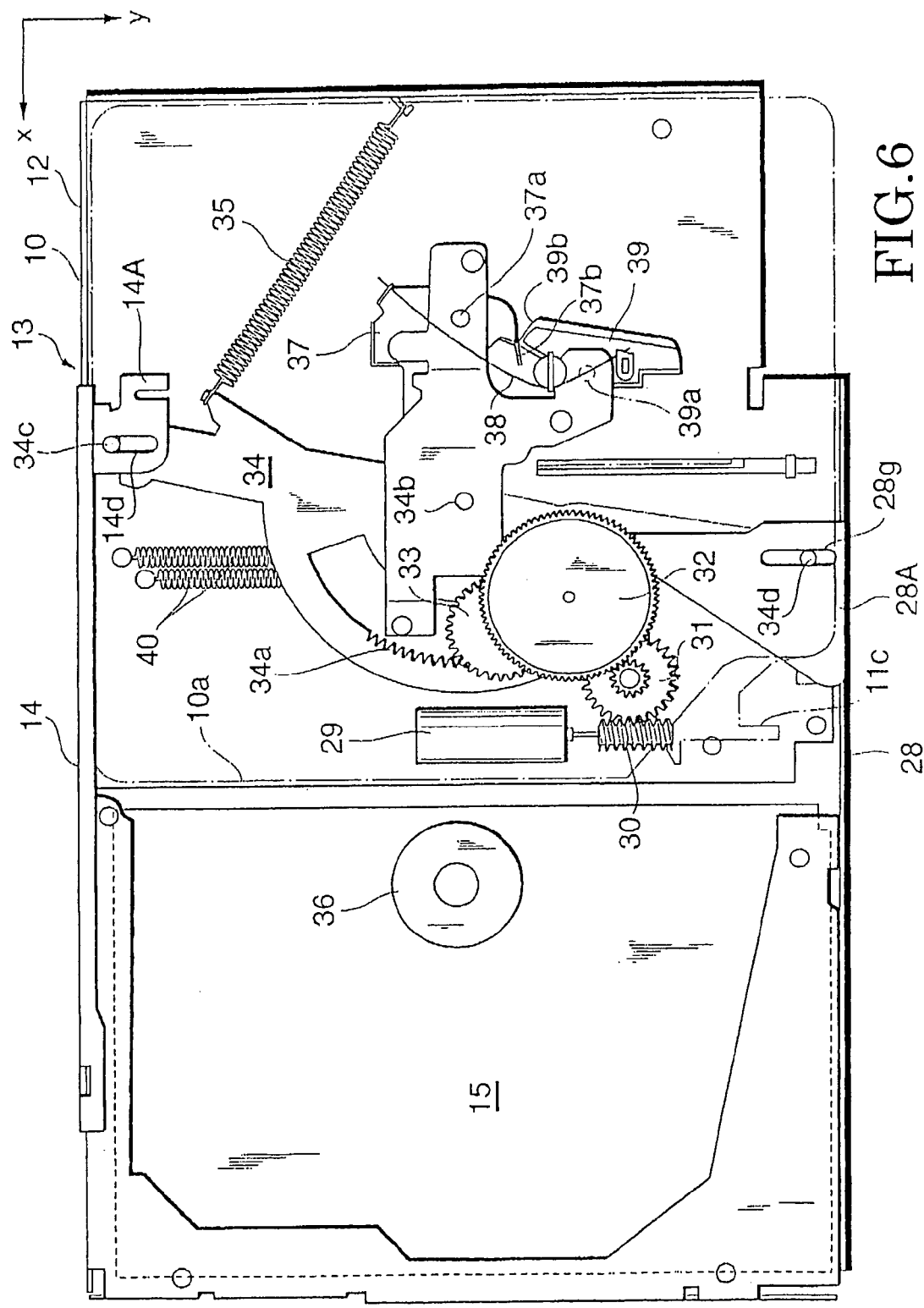
FIG. 6 is a bottom view indicating a bottom structure of the disc change of the present invention.

FIG. 6 is a bottom plane view of the disc changer made according to the present invention.

As shown in FIG. 6, a driving mechanism is provided on the bottom of the chassis structure 12 for driving the cam plate 14 and the cam plate 28 in the direction x. Such a driving mechanism comprises a motor 29, a worm 30 attached on the front end of the rotating shaft of the motor 29, a two-stage gear 31 engaged with the worm 30, two-stage gears 32 and 33 for transmitting a driving force from the motor 29, a gear portion 34a formed on a lever member 34 and engaged with the two-stage gear 33, with the lever member 34 being pivotable about a support shaft 34b. Such a lever member 34 is connected with a spring 35 in a manner such that the lever member 34 itself is urged in the clockwise direction.

An engaging pin 34c provided on one end of the lever member 34 is engaged in a guide hole 14d formed on a bent portion 14A of the cam plate 14. An engaging pin 34d formed on the other end of the lever member 34 is engaged in a guide hole 28g formed on a bent portion 28A of the cam plate 28. In this way, by virtue of a driving force from the motor 29, the lever member 34 may be caused to rotate in the counter clockwise direction against an urging force of the spring 35, thereby causing the cam plate 14 to move to the left, while making the cam plate 28 to move to the right in FIG. 6. On the other hand, by virtue of an opposite driving force from the motor 29, the lever member 34 may be caused to rotate in the clockwise direction against an pushing force of the spring 35, thereby causing the cam plate 14 to move to the right, while making the cam plate 28 to move to the left in FIG. 6.

In this way, with the movements of the cam plate 14 and the cam plate 28 in mutually opposite directions, the reproducing section 15 will be moved in the direction z, a selected disc will be drawn from a tray 11 and is clamped in position so as to be reproduced.

Further, on the bottom surface of the reproducing section 15 there is provided a spindle motor 36 for rotating a disc turntable (not shown).

An operation for moving the reproducing section 15 in the direction z will be described in detail with reference to FIGS. 2–6.

The pins 15a, 15b, 15c formed on the reproducing section 15 are engaged in the guide holes 12c, 12m and 12n of the chassis structure 12, with the pin 15a also engaged in the inclined guide holes 14c of the cam plate 14, and with the pins 15b, 15c also engaged in the inclined guide holes 28d and 28e of the cam plate 28, so that the reproducing section 15 is slidably supported on the cam plate 14 and the cam plate 28. The cam plates 14, 28 can receive a driving force from the motor 29 so as to be movable reciprocatingly in the direction x. In this way, the intersections of the guide holes 12c, 12m 12n with the inclined holes 14c, 28d, 28e are caused to shift, so as to move the reproducing section 15 in the direction z, causing a relative change in a positional relationship between the reproducing section 15 and the plurality of trays 11 stored in the magazine 10.

In this way, when the cam plate 14 is moved to the right in FIG. 2, the intersection of the guide hole 12c with the inclined hole 14c will move down, so that the engaging pin 15a will also move down. Meanwhile, the cam plate 28 is moved to the right in FIG. 5, the intersections of the guide holes 12m, 12n with the inclined hole 28d, 28e move down, so that the engaging pins 15b, 15c will also move down, thereby causing the reproducing section 15 to move down.

On the other hand, when the cam plate 14 is moved to the left in FIG. 2, the intersection of the guide hole 12c with the inclined hole 14c will move up, so that the engaging pin 15a will also move up. Meanwhile, the cam plate 28 is moved to the left in FIG. 5, the intersections of the guide holes 12m, 12n with the inclined hole 28d, 28e will move up, so that the engaging pins 15b, 15c will also move up, thereby causing the reproducing section 15 to move up.

The above operation is controlled by a control means (not shown).

Further, an eject lever (not shown, but having a generally rectangular shape) is provided on the bottom of the chassis structure 12 in a position which allows the insertion of the magazine 10. Upon being pressed by the magazine 10, the eject lever will move together with the magazine 10 in the direction y.

When the magazine 10 has not been inserted in the disc player, the eject lever is urged towards the insertion opening 13 by means of an eject spring 40, one end of which is connected with chassis structure 12 while the other end of which is connected with the eject lever. On the other hand, when the magazine 10 is inserted into the disc player along the direction y against the eject spring 40, the eject spring 40 will be pressed by the magazine 10 so as to move in the direction y.

Further, in a magazine insertion position on the bottom of the chassis structure 12, there is provided a detection arm 37 which can pivot about a shaft 37a in the counter clockwise direction along a cam portion of the eject lever, and can make On/Off of a magazine detection switch (not shown) attached to a core portion of the disc changer. What are provided on the magazine insertion position on the chassis structure 12 also includes a lock arm 39 which can move in a semicircular trace about a shaft 39a along a groove (not shown) formed on back surface of the magazine inserted in the direction Y. Further, there is provided a spring member 38 for urging the detection arm 37 and the lock arm 39. Here, the detection arm 37 and the lock arm 39 serve as moving members, while the spring member 38 serves as an urging member, and the magazine detection switch serves as a lock detection switch.

Thus, the magazine 10 inserted on the chassis structure 12 may be detected in the following way.

Namely, when the magazine 10 has not been inserted, the magazine detection switch will be in a SW-OFF position, based on a fact that the detection arm 37 is in a non-pivotable position.

When the magazine 10 begins to be gradually inserted through the insertion opening 13, the lock arm 39 will then begins to pivot in a counter clockwise direction along an insertion groove formed on the magazine 10, and is caused to wait at a position serving as stopper for stopping the detection arm 37. Meanwhile, the detection arm 37 begins to pivot about the shaft 37a in the counter clockwise direction toward SW-ON position along the cam portion of the eject lever. When an engaging surface 39b of the lock arm 39 comes into contact with an engaging surface 37b of the detection arm 37, the pivoting movement of the detection arm 37 will be stopped.

Afterwards, when the magazine 10 is inserted still further into the disc player, the lock arm 39 is caused to pivot slightly in the clockwise direction along a groove formed on the magazine 10, so that the engaging portion 37b of the detection arm 37 as well as the engaging portion 39b of the lock arm 39 are caused to move rightwardly (in FIG. 6), thereby releasing the stopped state of the detection arm 37.

Then, the detection arm 37 is caused to pivot slightly in the counter clockwise direction along the cam portion of the eject lever. Meanwhile, the lock arm 39 (which is freely pivotable about the support shaft 39a) will partially engage in the groove formed on the magazine 10, thereby locking the magazine 10 on the chassis structure 12 by virtue of an urging force produced by the spring member 38.

In this way, once the magazine 10 is locked, the detection arm 37 will make ON the magazine detecting switch, thereby detecting that the magazine has been locked.

Next, explanation will be given to an operation for drawing out a selected tray from the magazine 10 on to the reproducing position in the disc player, with reference to FIGS. 2 to 10.

At first, the reproducing section 15 is raised to an uppermost position within the disc player, while the cam plate 14 (on the front side of the disc player) is positioned on the left side (FIG. 2). At this time, the engaging pin 15a is located at the left end of the uppermost portion (horizontal portion) of the inclined hole 14c. Meanwhile, the cam plate 28 (on the rear side of the disc player) is positioned on the left side (FIG. 5), with the pins 15b and 15c respectively located at the left ends of the uppermost portions (horizontal portions) of the inclined holes 28d, 28e.

At this moment, since the reproducing section 15 is in the uppermost position within the disc player, the protrudingly bent portion 26B of each stopper element 26 (attached on the chassis structure 12) is pressed by a pressing portion 15d of the reproducing section 15 so that the protrudingly bent portion 26B protrudes through the hole 12k (formed on the chassis structure 12) in the direction y. In this manner, the protrudingly bent portion 26B being pressed by the pressing portion 15d, is caused to protrude outwardly through the uppermost hole 28f (formed on the cam plate 28), thereby making the stopper portion 26C of the stopper element 26 to move away from an uppermost tray, thus rendering the uppermost tray to be movable in the direction x.

Figure 7:
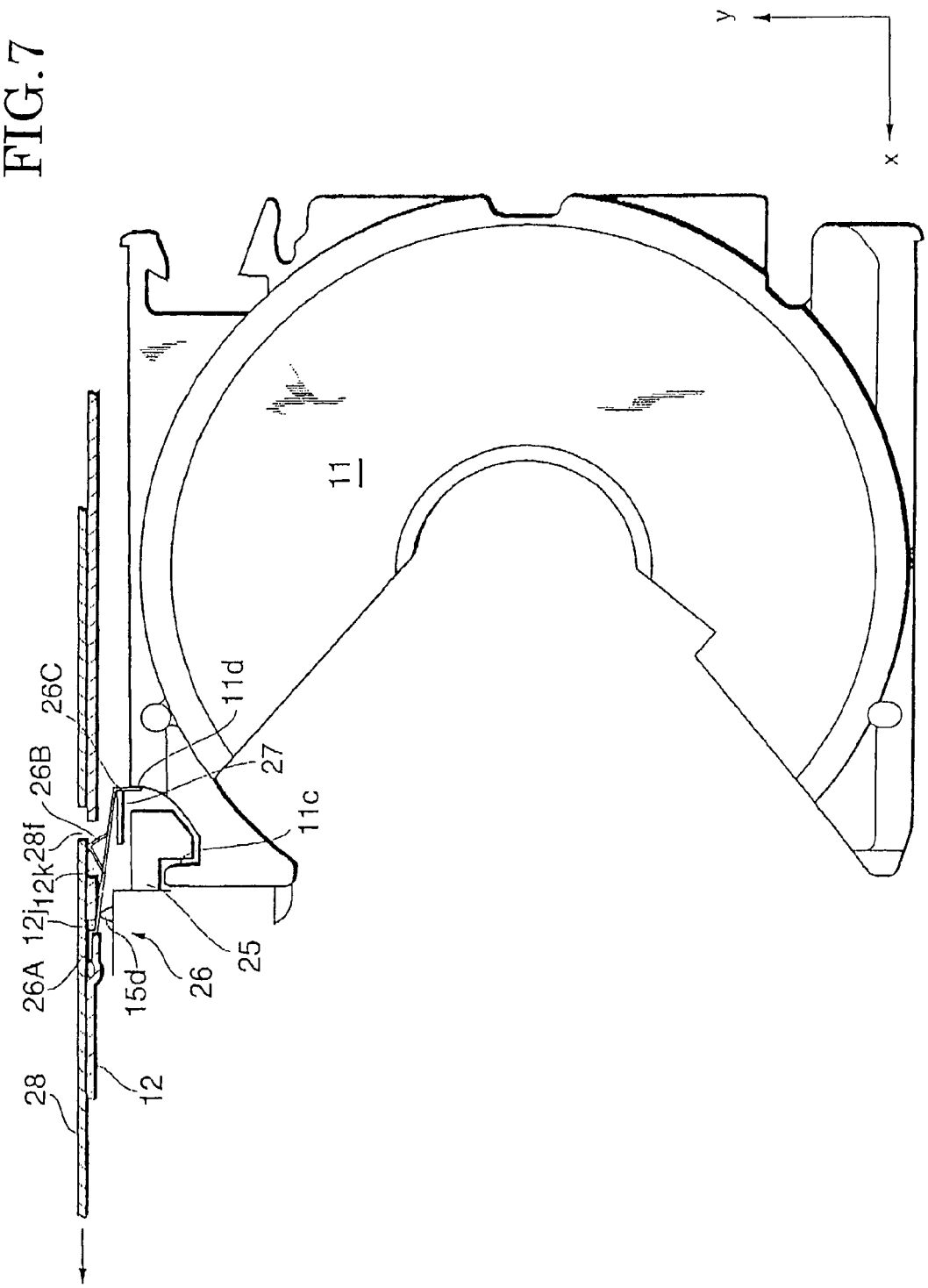
FIG. 7 is an explanatory view indicating an operational relationship between a tray and a stopper element.

At this time, the magazine 10 containing a plurality of discs is inserted through the insertion opening 13 into the disc player in the direction y, the magazine 10 will then be fixed within the disc player by virtue of the detection arm 37. In this way, as shown in FIG. 7, the end portions 11d of the trays 11 are in contact with the stopper portions 26C of the stopper members 26, thereby preventing possible movement of the trays 11 in the direction x, thus preventing the trays 11 from accidentally jumping out of the magazine 10.

When there is a command for reproducing a selected disc, the controller (not shown) enables the motor 29 to rotate so as to cause the cam plates 14 and 28 to move in the direction x. In detail, the cam plate 14 is moved to the right (in FIG. 2), causing the intersection of the guide hole 12c with the inclined hole 14c to move down, thereby moving down the engaging pin 15a. Meanwhile, the cam plate 28 is moved to the right (in FIG. 5), i.e., moved to the left (in FIG. 7), so that the intersections of the guide holes 12m, 12n with the inclined holes 28d, 28e are caused to move down, thereby moving down the engaging pins 15b and 15c. In this way, the reproducing section 15 may be moved down in the direction z, so as to reach a height corresponding to a selected tray mounting a selected disc which is to be reproduced.

Figure 8:
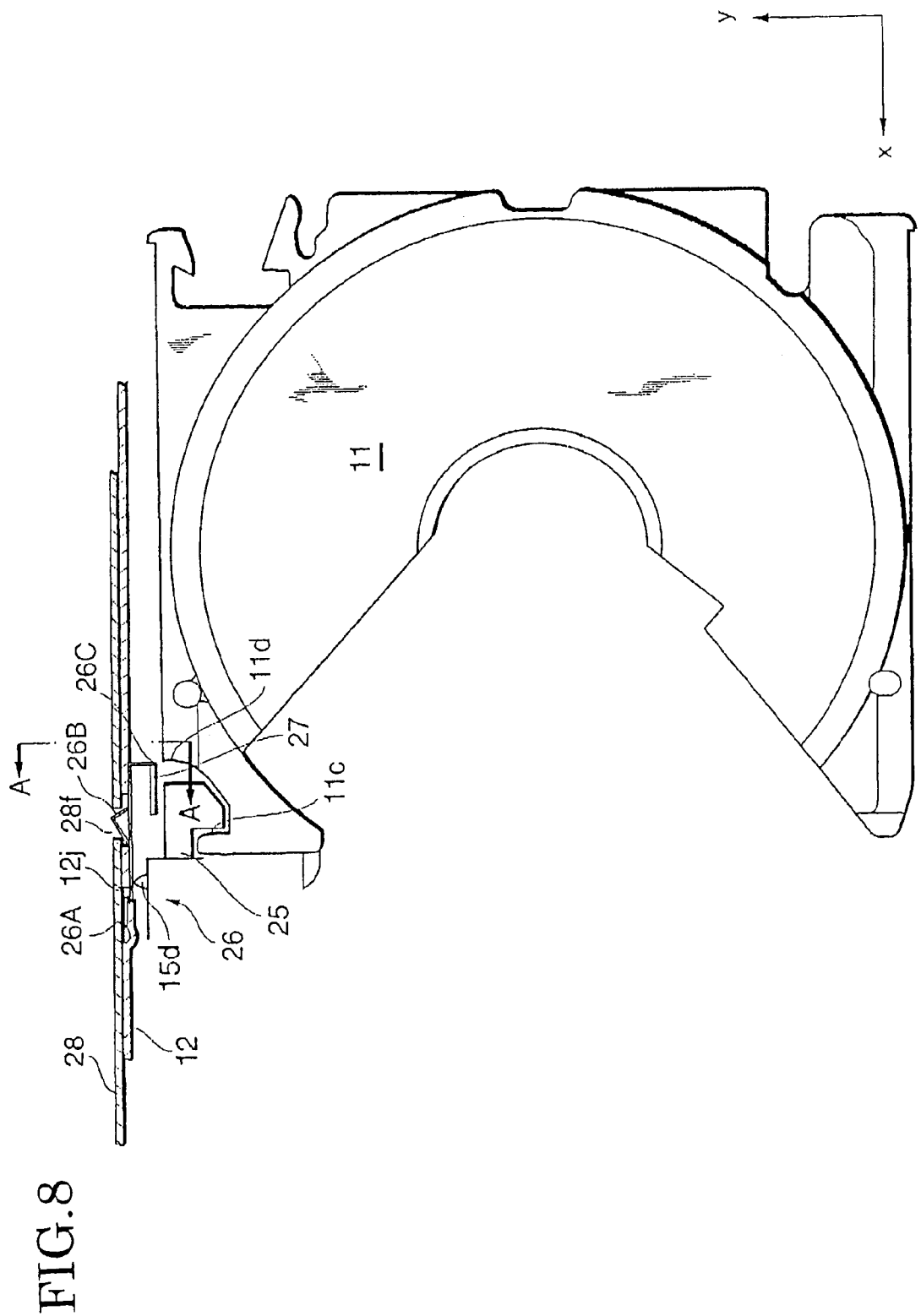
FIG. 8 is an explanatory view indicating an operational relationship between a tray and a stopper element.

At this moment, as shown in FIG. 8, the height of one of the window holes 28f formed on the cam plate 28 becomes coincident with the height of a stopper portion 26C (of a stopper element 26) engaged with the tray 11 mounting the selected disc.

Figure 9:
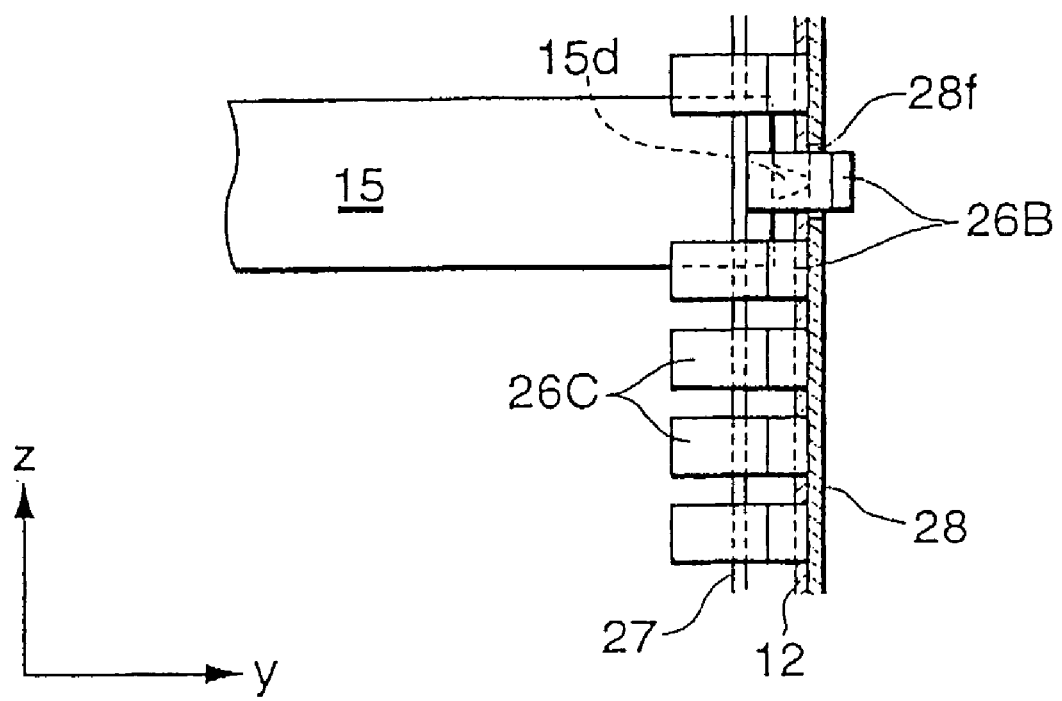
FIG. 9 is a sectional view taken along line A—A in FIG. 8.

Then, the protruding portion 15d of the reproducing section 15 will outwardly press a stopper element 26 at a height corresponding to the selected tray 11, so that a bent protruding portion 26B of the stopper element 26 is caused to protrude outwardly through a window hole 28f. In this manner, an engagement between the stopper portion 26C (of the stopper element 26) and the end portion 11d of the selected tray is released, thereby making the selected tray 11 movable in the direction x (FIG. 9).

Figure 10:
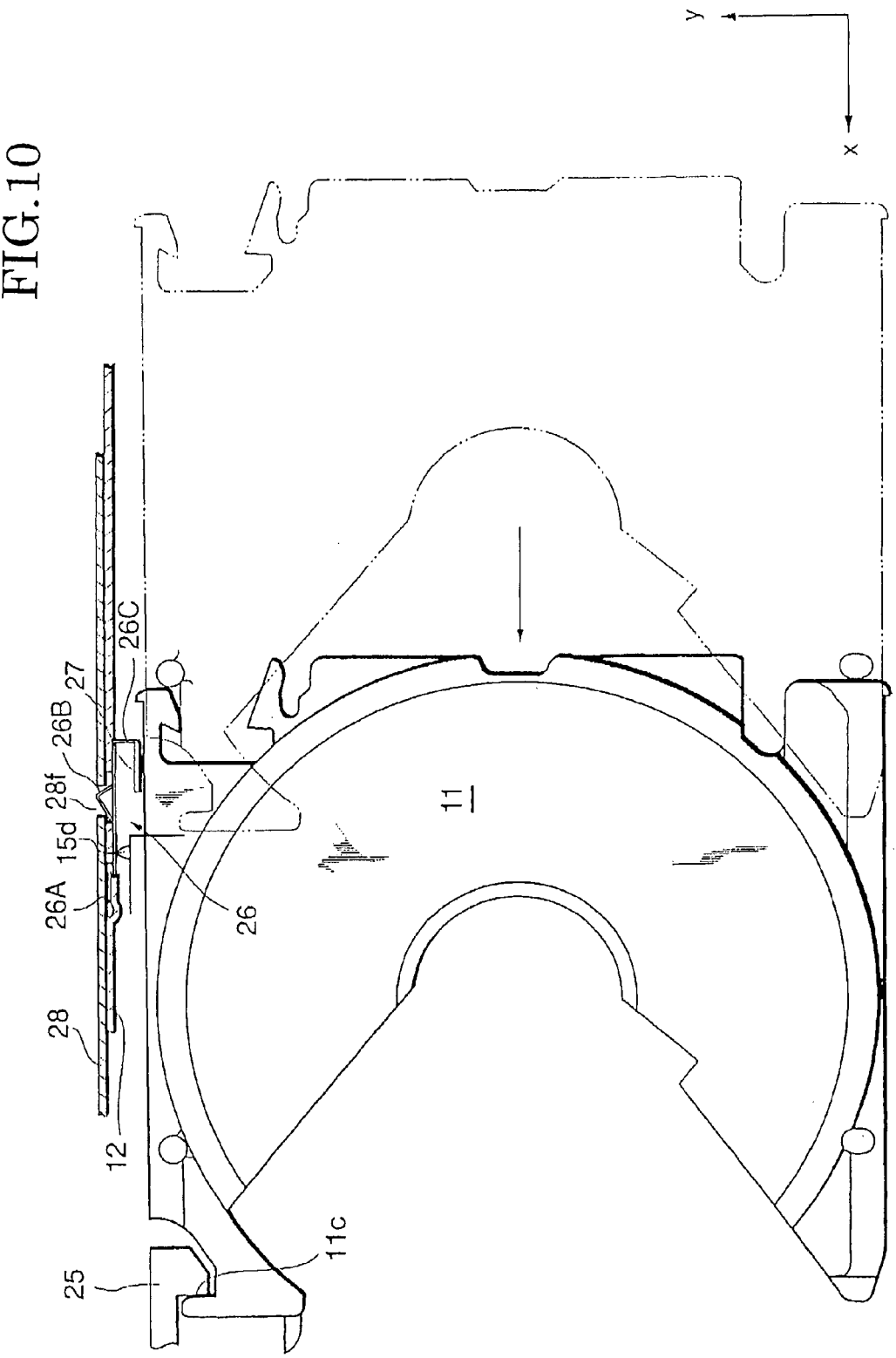
FIG. 10 is an explanatory view indicating an operational relationship between a tray and a stopper element.

Then, as shown in FIG. 10, the selected tray 11 made movable in the direction x is drawn by a tray drawing element 25 provided on the reproducing section 15, so as to move the selected tray 11 to a disc reproducing position and clamp the selected disc on a turntable (not shown).

Figure 11:
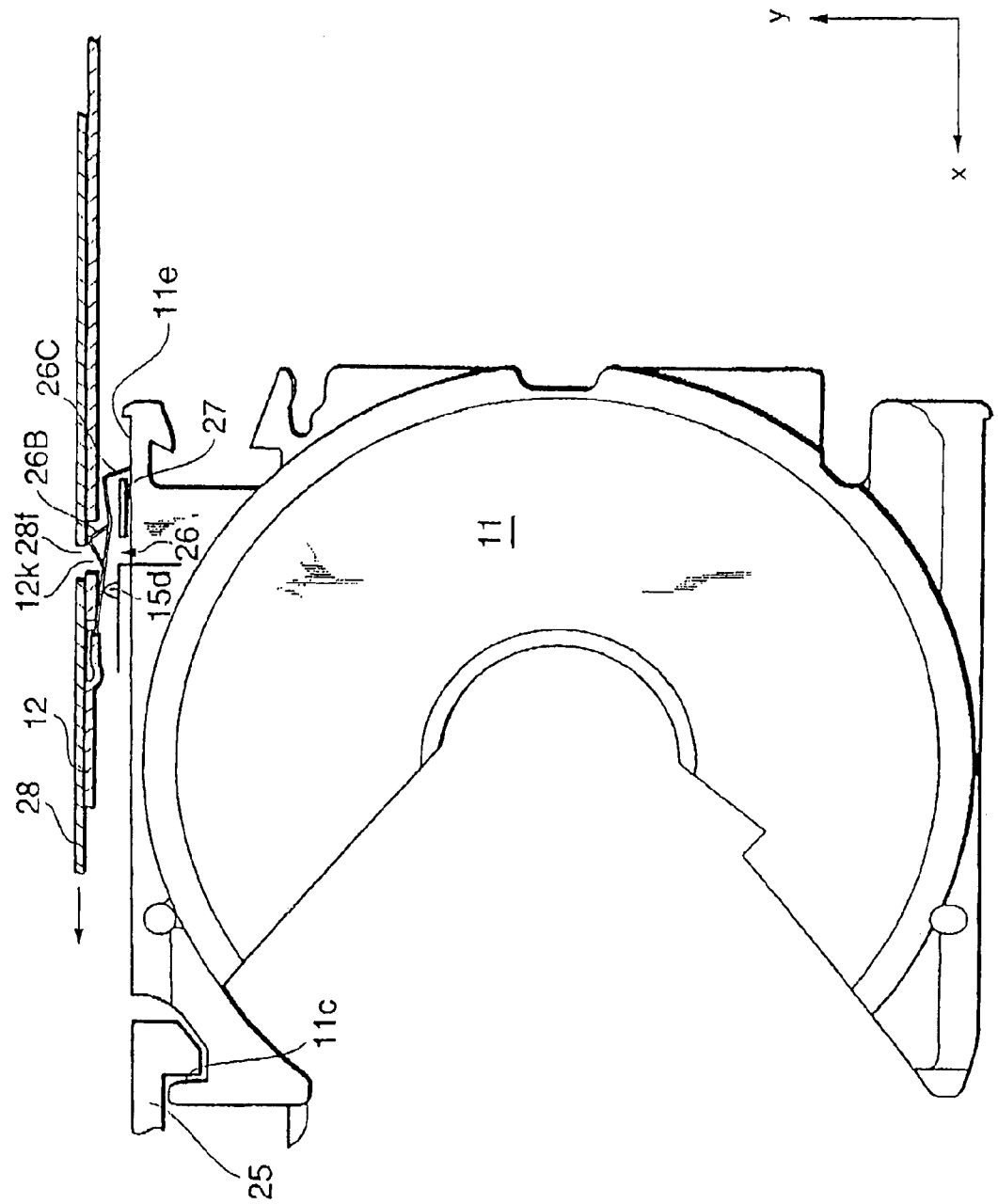
FIG. 11 is an explanatory view indicating an operational relationship between a tray and a stopper element.

Subsequently, referring to FIG. 11, the cam plate 28 is slightly moved leftwardly (in FIG. 11), so as to make the window hole 28f to deviate away from the bent protruding portion 26B of the stopper element 26. Afterwards, the bent protruding portion 26B is again pressed by the cam plate 28, so that the stopper portion 26C may press an end portion lie of the tray 11 in order to prevent a possible vibration of the tray 11, thereby starting reproducing the selected disc.

At this moment, other trays 11 not in the reproducing position are in a state shown in FIG. 7. Namely, each of these trays 11 is pressed at one end thereof by a stopper element 26 which is in turn pressed by the cam plate 28. In this way, it is exactly sure to prevent any of these trays 11 from jumping accidentally out of the magazine 10.

In this way, with regard to the disc changer formed according to the above-described embodiment of the present invention, when the magazine 10 is inserted into the disc changer, the lock arm 39 which will be moved by such insertion is engaged into the insertion groove formed on the backside of the magazine, thereby actuating the magazine detection switch by virtue of the detection arm 37. Furthermore, the detection arm 37 and the lock arm 39 are urged by the urging spring 38. In this way, since the moving members (including the detection arm 37 and the lock arm 39) which lock the magazine on the disc changer can actuate the lock detection switch, it becomes possible to more exactly (than a conventional configuration in which the magazine itself actuates the detection switch) detect the attachment of the magazine without receiving any undesirable influence caused by an external vibration.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A disc changer comprising:
 a magazine for storing a plurality of arranged discs;
 a disc carrier for carrying a selected disc from the magazine to a reproducing position;

a transporter for transporting the disc carrier in the disc arranging direction;

a disc playing section for playing the selected disc carried from the magazine;

a moving section which moves when the magazine is inserted into the disc changer;

an urging member for urging the moving section; and a lock detector operable by the movement of the moving section, wherein when the magazine is inserted into the disc changer the moving section engages into an insertion groove provided on the magazine to lock the magazine on the disc changer, and actuates the lock detector.

2. A disc changer according to claim 1, wherein the moving section includes a lock arm for engaging into the insertion groove and a detection arm for actuating the lock detector, wherein the movement of the lock arm and the movement of the detection arm are in synchronism with each other.

* * * * *